United States Patent [19]

Hayashi

[11] Patent Number: 5,517,476
[45] Date of Patent: May 14, 1996

[54] DIGITAL SIGNAL REPRODUCING APPARATUS USING A VITERBI DECODER

[75] Inventor: Hideki Hayashi, Tsurugashima, Japan

[73] Assignee: Pioneer Electric Corporation, Tokyo, Japan

[21] Appl. No.: 380,390

[22] Filed: Jan. 30, 1995

[30] Foreign Application Priority Data

Feb. 4, 1994 [JP] Japan ................................. 6-012711

[51] Int. Cl.$^6$ ........................................... G11B 7/00
[52] U.S. Cl. ......................... 369/59; 369/50; 369/47; 369/124; 360/51
[58] Field of Search .................... 369/59, 60, 47, 369/48, 49, 50, 54, 124; 360/51, 32, 46

[56] References Cited

U.S. PATENT DOCUMENTS 5,448,544  9/1995  Tsuchinaga et al. .................. 369/59

Primary Examiner—Georgia Y. Epps
Assistant Examiner—Muhammad N. Edun
Attorney, Agent, or Firm—Sughrue, Mion, Zinn, Macpeak & Seas

[57] ABSTRACT

A digital signal reproducing apparatus which can reproduce a digital signal without deteriorating the performance of a Viterbi decoder being deteriorated even if a positional error due to some mechanism causes in reproducing information from a recording medium or amplitude fluctuation in a red signal due to fluctuation in characteristics of the recording medium should occur. The digital signal reproducing apparatus performs an A/D conversion of a read signal read from the recording medium to convert it to a digital sample value series, obtains an amplitude value according to a result of subtraction between a maximum sample value having a maximum level of sample values in the sample value series and a minimum sample value having a minimum level of sample values in said sample value series, and supplies a value obtained by uniformly each of the estimated sample values in a Viterbi decoder by this amplitude value as a final estimated sample value to the Viterbi decoder.

5 Claims, 20 Drawing Sheets

FIG.15

| AMPLITUDE | ADDRESS | STORED DATA | | |
|---|---|---|---|---|
| | | a | b | c |
| 1.7 | 0 | −0.85 | 0 | 0.85 |
| 1.8 | 1 | −0.9 | 0 | 0.9 |
| 1.9 | 2 | −0.95 | 0 | 0.95 |
| 2.0 | 3 | −1 | 0 | 1 |
| 2.1 | 4 | −1.05 | 0 | 1.05 |
| 2.2 | 5 | −1.1 | 0 | 1.1 |
| 2.3 | 6 | −1.15 | 0 | 1.15 |

FIG.21

| AMPLITUDE | ADDRESS | STORED DATA | |
|---|---|---|---|
| 1.7 | 0 | $0.85 \cdot C_0$ | $0.85 \cdot C_1$ |
| 1.8 | 1 | $0.9 \cdot C_0$ | $0.9 \cdot C_1$ |
| 1.9 | 2 | $0.95 \cdot C_0$ | $0.95 \cdot C_1$ |
| 2.0 | 3 | $C_0$ | $C_1$ |
| 2.1 | 4 | $1.05 \cdot C_0$ | $1.05 \cdot C_1$ |
| 2.2 | 5 | $1.1 \cdot C_0$ | $1.1 \cdot C_1$ |
| 2.3 | 6 | $1.15 \cdot C_0$ | $1.15 \cdot C_1$ |

DIGITAL SIGNAL REPRODUCING APPARATUS USING A VITERBI DECODER

BACKGROUND OF THE INVENTION

1. Field of the Invention

The present invention relates to an apparatus for reproducing a digital signal recorded on a recording medium such as an optical disk, a magnetic disk, a magnetic tape or the like.

2. Background of the Invention

Viterbi Algorithm is known as one of methods for decoding a digital signal recorded at a high density on a recording medium with high reliability. In the Viterbi Algorithm, a read signal read from the recording medium is not simply identified as a binary value of 1 or 0 according to a predetermined threshold value, but sample values obtained by sampling read signals are detected as a continuous time-series, and a probable data series is obtained based on this-series.

A Viterbi decoder assumes state transition in a series of sample values successively supplied from an A/D convertor according to each estimated sample value stored in an estimated value memory (one of this status transitions is called branch, while continuous state transitions are called path), computes a branch-metric indicating probability of a branch as well as a path-metric indicating probability of a path, and decodes a probable data series according to the branch-metric and path-metric.

Namely, a Viterbi decoder computes a branch-metric and a path-metric according to same sample value stored in a sample value series supplied from an A/D convertor as well as to a plurality of estimated sample values stored in an estimated sample memory, and thus decodes a data series providing a minimum square error to an input data series to a regenerated digital signal. By executing Viterbi decoding, even if an S/N ratio of a read signal is low, data decoding can be executed at high reliability.

On the other hand, a optical pick-up in an optical disk reproducing apparatus can accurately track a recording track on an optical disk and read information therefrom, even if such a mechanical fluctuation such as a surface displacement, eccentricity, and inclination occurs, by executing focus servo and tracking servo. However, even if the servo system as described above is operating normally, sometimes a positional error which can not be followed due to a degree of mechanical fluctuation may remain. Also in some cases optical characteristics such as a reflection factor or a refractive index of the optical disk itself may change. If the residual error or change in the optical characteristics as described above occurs, an amplitude of a read signal fluctuates. For this reason, a sample value corresponding to the amplitude fluctuation is supplied to the Viterbi decoder in this step.

For this reason, in a binary value discrimination method in which discrimination for "0" or "1" is executed by comparing a given value to a specified threshold value, even if the amplitude fluctuation as described above is generated in a read signal, a digital signal can be regenerated without being affected by this phenomenon.

In Viterbi decoding, however, a level value itself of a read signal is used as a parameter for computing to decode a digital signal, so that, if amplitude fluctuation occurs in the read signal, the decoding performance is disadvantageously deteriorated.

A digital signal reproducing apparatus according to a first aspect of the present invention is a digital signal reproducing apparatus which obtains digital signals by reproducing recorded information from read signals read from a recording medium on which digital signals are recorded, and comprises an A/D convertor which successively sample the read signals and converts the signals to a digital sample value series, a sample value extracting means for extracting specified sample values from the sample value series, an offset effects by fluctuation of characteristics in the recording medium, a sample value extracting means for extracting a maximum sample value having a maximum level and a minimum sample value having a minimum level from sample values in the sample value series, an amplitude value detecting means for obtaining an amplitude value based on a result of subtraction of the minimum sample value from the maximum sample value and generating an amplitude signal according to the amplitude value, a dividing means for obtaining a result of division of a value corresponding to the amplitude signal by each sample value in the sample value series as an amplitude-corrected sample value, and a decoding means for obtaining a regenerated digital signal by means of executing decoding processing according to the amplitude-corrected sample value.

A digital signal reproducing apparatus according to a second aspect of the present invention is a digital signal reproducing apparatus which obtains digital signals by reproducing recorded information from read signals read from a recording medium on which digital signals are recorded, and comprises an A/D convertor which successively sample the read signals and converts the signals to a digital sample value series, a sample value extracting means for extracting a maximum sample value having a maximum level and a minimum sample value having a minimum level from sample values in the sample value series, an amplitude value detecting means for obtaining an amplitude value based on a result of subtraction of the minimum sample value from the maximum sample value and generating an amplitude signal according to the amplitude value, an estimated value memory for storing therein a plurality of estimated sample values each probable as a sample value in the sample value series, a multiplying means for obtaining a result of multiplication of uniformly multiplying each of the estimated sample value by a value corresponding to the amplitude signal as an amplitude-corrected estimated sample value, and a Viterbi decoder for decoding a data series providing an accumulative sum of square error values between samples values in the sample value series and the amplitude-corrected estimated sample value as the regenerated digital signal.

A digital signal reproducing apparatus according to a first feature of the present invention subjects a read signal read from a recording medium to A/D conversion to convert it to a digital sample value series, obtains an amplitude value according to a result of subtraction of a minimum value having a minimum level from a maximum level having a maximum level both in the sample value series, and obtains a corrected sample value with amplitude fluctuation having been corrected by uniformly dividing each sample value subjected to the A/D conversion by the amplitude value.

A digital signal reproducing apparatus according to a second feature of the present invention subjects a read signal read from a recording medium to A/D conversion to convert it to a digital sample value series, obtains an amplitude value according to a result of subtraction of a minimum sample value having a minimum level from a maximum sample value having a maximum level both in the sample value series, and supplies a result of cation by uniformly multiplying each of the estimated values in the Viterbi decoder by this amplitude value as a final estimated sample value to the Viterbi decoder.

BRIEF DESCRIPTION OF THE DRAWINGS

FIG. 15 is a diagram showing an example of a memory map in a estimated value memory 30';

FIG. 21 is a diagram showing an example of a memory map for a coefficient memory 28.

DETAILED DESCRIPTION OF THE PREFERRED EMBODIMENTS

Before explaining the embodiments of the present invention specifically, a description is made hereinafter for a conventional type of digital signal reproducing apparatus with reference to the accompanying drawings.

Figure 1:
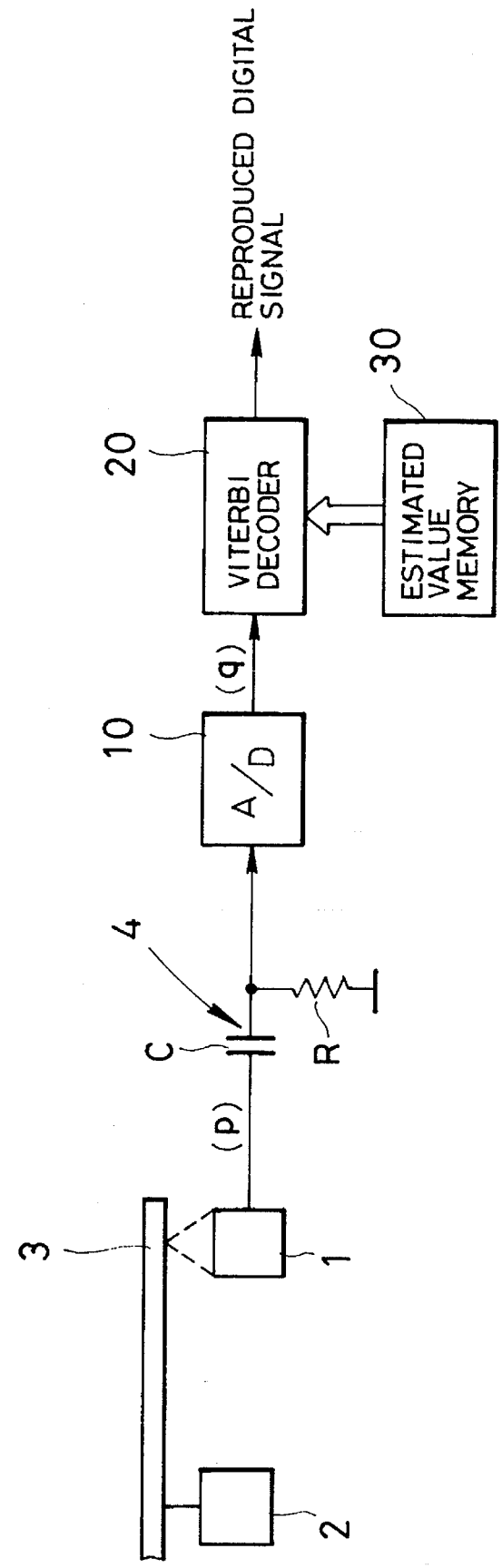
FIG. 1 is a diagram showing configuration of a conventional type of digital signal reproducing apparatus.

FIG. 1 is a diagram showing the configuration of a digital signal reproducing apparatus which regenerates digital signals recorded at a high density on an optical disk as an optical recording medium by applying the Viterbi decoding as described above.

In this figure, an optical pick-up 1 irradiates a light beam to an optical disk 3 driven and rotated by a spindle motor 2. Furthermore the optical pick-up 1 obtains a read signal "p" by performing a photoelectric conversion of a reflected light from the optical disk 3 and supplies the read signal "p" to a bias circuit 4 comprising a capacitor C and a resistor R.

Figure 2A:
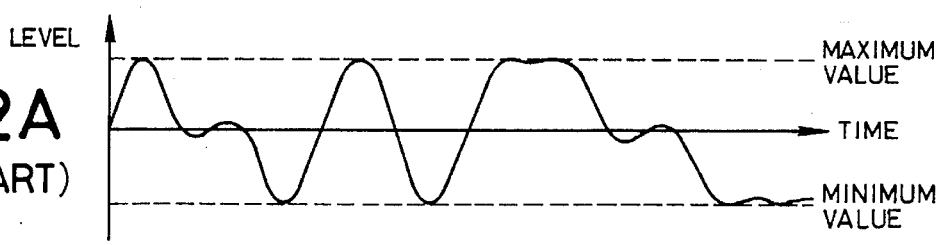
FIG. 2A is a diagram showing an example of a waveform of a read signal "p"

An example of the read signal "p" is shown by a solid line in FIG. 2A. In FIG. 2A, when the change of waveform of the read signal "p" is observed in a relatively long period of time, a maximum value and a minimum value of a signal level in the read signal "p" are as shown by the dashed line in this figure. Namely, when observed in a relatively long period of time, it can be said that an amplitude of the read signal "p" is generally constant.

A bias circuit 4 removes a DC element in a read signal "p" supplied from the optical pick-up 1 and supplies the signal with the DC element having been removed to an A/D convertor 10. The A/D convertor 10 converts the read signal supplied through the bias circuit 4 from the optical pick-up 1 at a specified timing to a digital sample value series "q", and supplies it to a Viterbi decoder 20. Previously stored in the estimated value memory are stored a plurality of estimated sample values as ideal values provable as sample values in the sample value series "q" (values obtained when not effected by noise or the similar factors).

The Viterbi decoder 20 assumes state transitions (one of the state transitions is called branch, and continuous state transition is called path), and computes a branch-metric indicating probability of the branch and a path-metric indicating probability of the path. The Viterbi decoder decodes a probable data series based on the branch-metric and path-metric.

Figure 3:
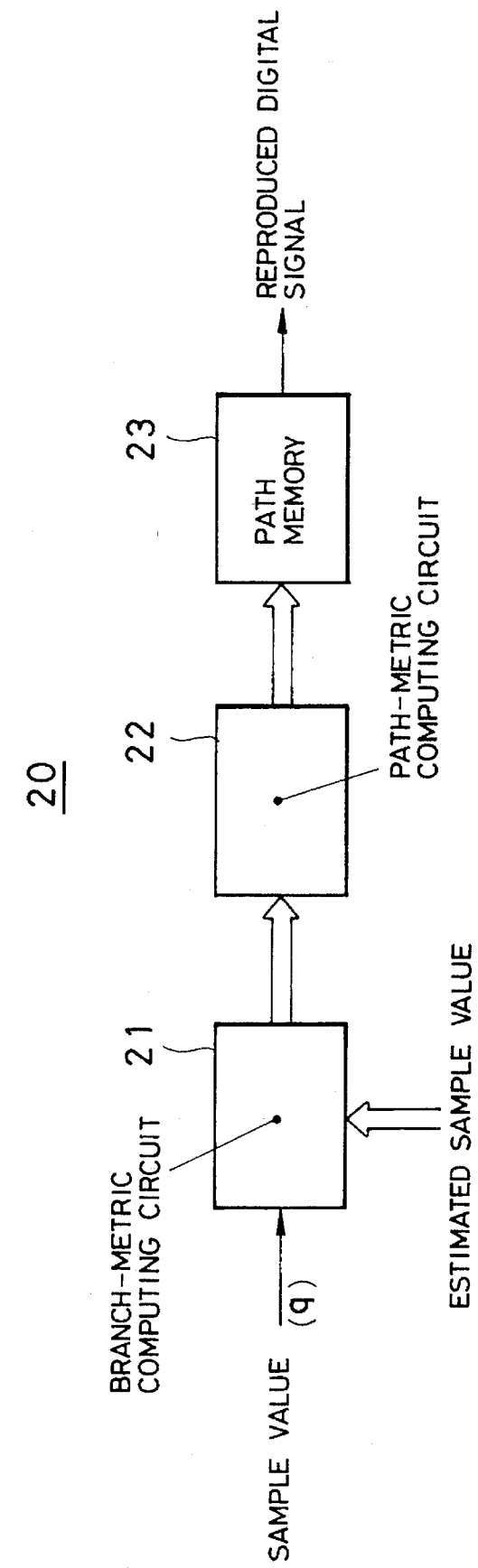
FIG. 3 is a diagram showing internal configuration of a Viterbi decoder 20.

FIG. 3 is a diagram showing internal configuration of the Viterbi decoder 20.

In this figure, a branch-metric computing circuit 21 obtains square errors each between each of a plurality of estimated sample values stored in the estimated value memory 30 and each sample value in the sample value series "q", namely {[sample value series "q"] - [ Estimated sample value ]} and supplies the square errors as branch-metric signals to a path-metric computing circuit 22. A path-metric computing circuit 22 obtains a path-metric by computing an accumulative sum of the branch-metric signals for each path, and supplies a path select signal indicating a path providing a minimum accumulative sum to a path memory 23. The path memory 23 updates data series consisting of binary values of 0 and 1 according to the path select signal and successively outputs the data series as regenerated digital signals.

Figure 4:
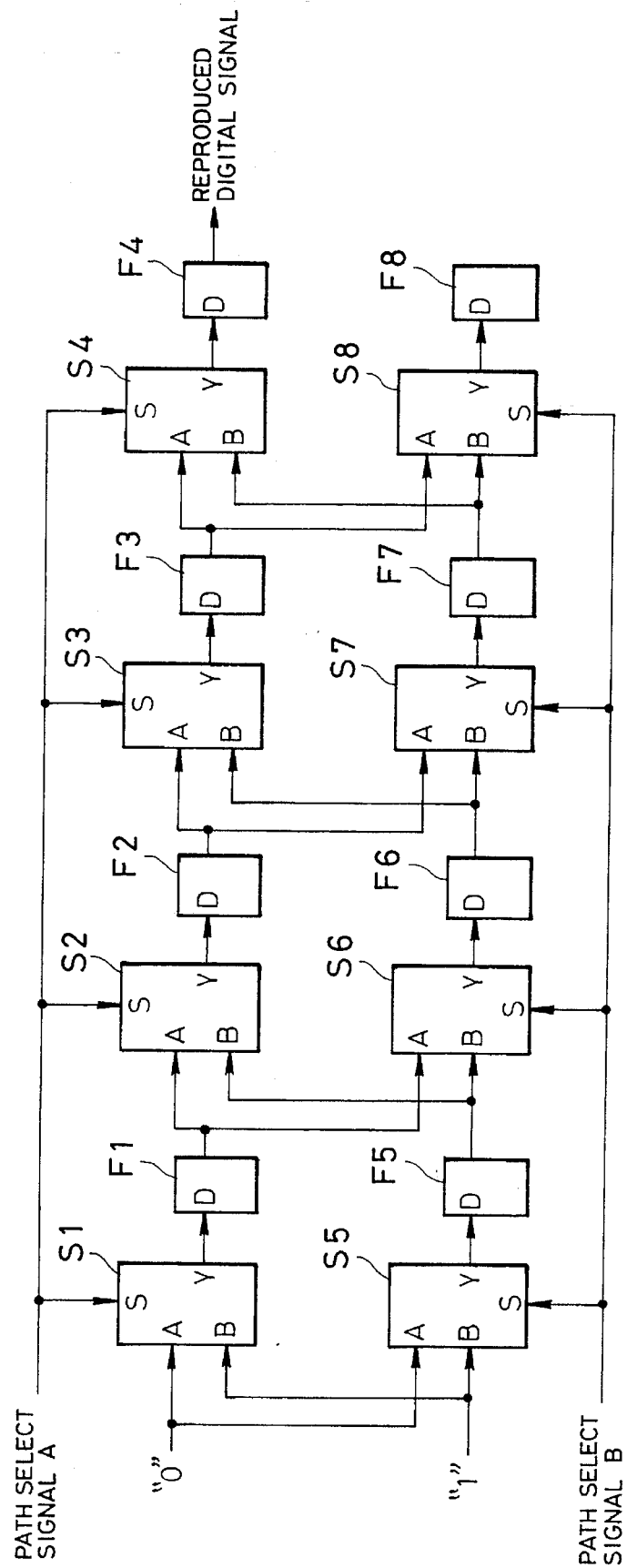
FIG. 4 is a diagram showing an example of internal configuration of a path memory 23.

FIG. 4 is a diagram showing an example of internal configuration of a path memory 23.

In this figure, if the path select signal A is logic "0", a register comprising flip-flops F1 to F4 shift and output binary value digital signals stored in each of the flip-flops F1 to F4 successively from the flip-flop F4. In this step, the flip-flop F1 fetches signals indicating the logic "0" supplied thereto through a selector S1 and stores the signals therein. On the other hand, if the path select signal A is logic "1", a register comprising the flip-flops F2 to F4 fetches and stores binary value digital signals stored in each of flip-flops F5 through F7. In this step, the flip-flop F1 fetches and stores therein signals indicating logic "1" supplied thereto through the selector S1. If a path select signal B is logic "0", a register comprising flip-flops F6 to F8 fetches and stores therein binary value digital signals stored in each of the flip-flop F1 through F3. In this step, the flip-flop F5 fetches and stored therein signals indicating logic "0" supplied thereto through a selector S5. On the other hand, if the pas select signal B is logic "1", a register comprising the flip-flops F5 to F8 shifts binary value digital signals stored in each of the flip-flops F5 to F8. In this step, the flip-flop F5 fetches and stores therein signals indicating logic "1" supplied thereto through the selector S5. It should be noted that operations of the flip-flops F1 to F8 described above are executed once for a specified clock timing (not shown).

With the configuration as described above, data series each comprising binary values of "0" and "1" are updated according to a path select signal and are successively outputted as regenerated digital signals.

It should be noted that, although a number of shift steps is based on 4-bit configuration in the sample shown in FIG. 4, actually a number of shift steps based on 20 to 200-bit configuration is often used.

As described above, the Viterbi decoder 20 computes a branch-metric and a path-metric according to each sample value in a sample value series "q" supplied from the A/D convertor 10 and each of a plurality of estimated sample values stored in the estimated value memory 30, and decodes a data series providing a minimum square errors among inputted data series as a regenerated digital signal. Data decoding can be carried out at high reliability by executing Viterbi decoding as described above even in a case where S/N of a read signal "p" is low.

Herein, in the optical pick-up 1 shown in FIG. 1, even if such a mechanical fluctuation such as a surface displacement, eccentricity, and inclination occurs, by executing focus servo and tracking servo. However, even if the servo system as described above is operating normally, sometimes a positional error which can not be followed due to a degree of mechanical fluctuation may remain. Also in some cases optical characteristics such as a reflection factor or a refractive index of the optical disk itself may change. If the residual error or change in the optical characteristics as described above occurs, an amplitude of a read signal "p" fluctuates as shown by the solid line in FIG. 2B. For this reason, a sample value corresponding to the amplitude fluctuation is supplied to the Viterbi decoder in this step.

Herein, in the binary value discriminating method in which discrimination as to "0" or "1" is executed by comparing a given value to a specified threshold value, even if the amplitude fluctuation as described above occurs in a read signal "p", a digital signal can be regenerated without being affected by the fluctuation.

Figure 2B:
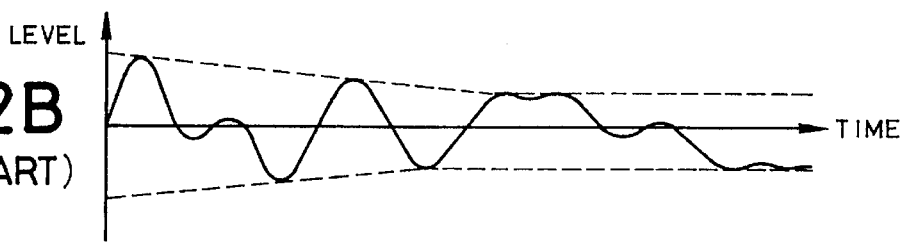
FIG. 2B is a diagram showing an example of a waveform of a read signal "p"

However, in Viterbi decoding, a digital signal is decoded by using a level value of the read signal "p" itself as a parameter for computing, if the amplitude fluctuation as shown in FIG. 2B is generated in the read signal "p", the decoding performance is disadvantageously deteriorated.

Next detailed description is made for embodiments of the present invention.

Figure 5:
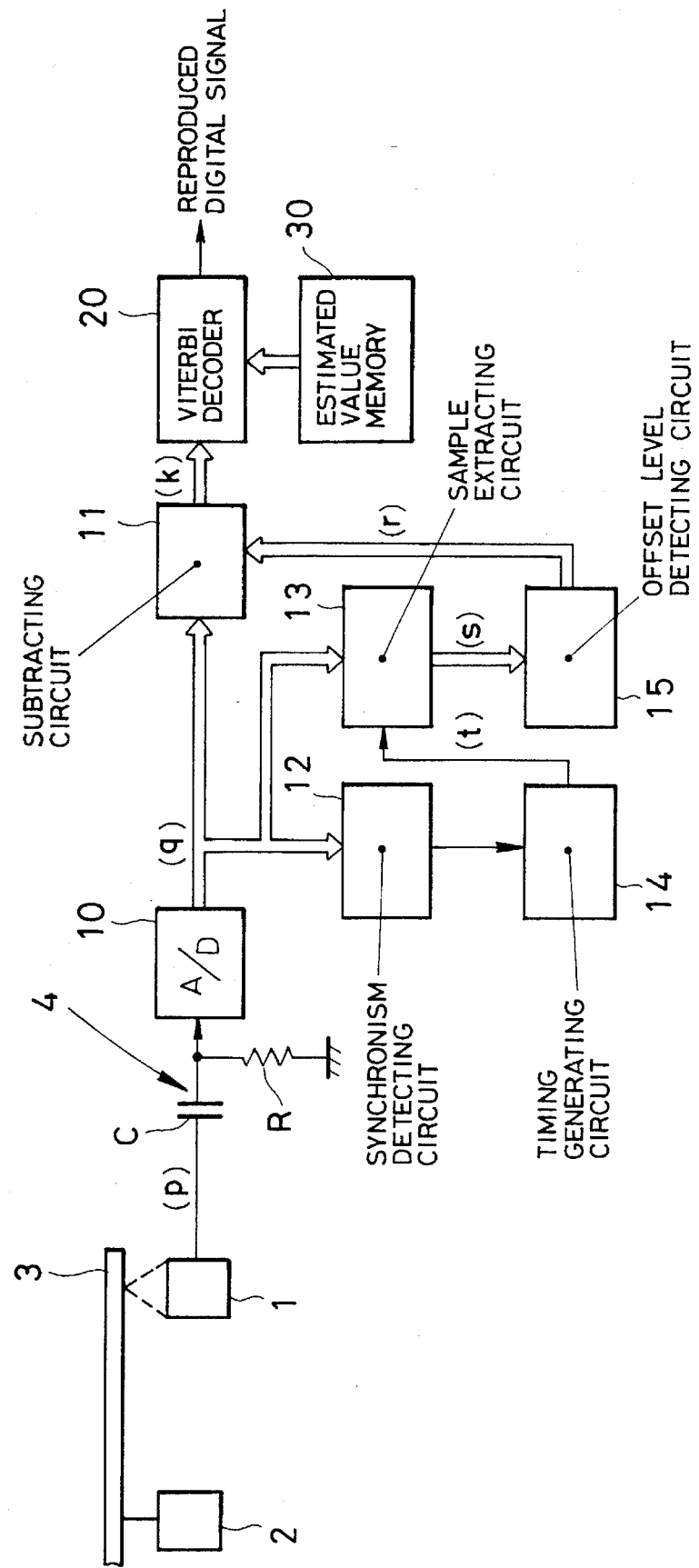
FIG. 5 is a diagram showing configuration of a digital signal reproducing apparatus according to a first feature of the present invention.

FIG. 5 is a diagram showing configuration of a digital signal reproducing apparatus according to the first feature of the present invention.

Figure 6:
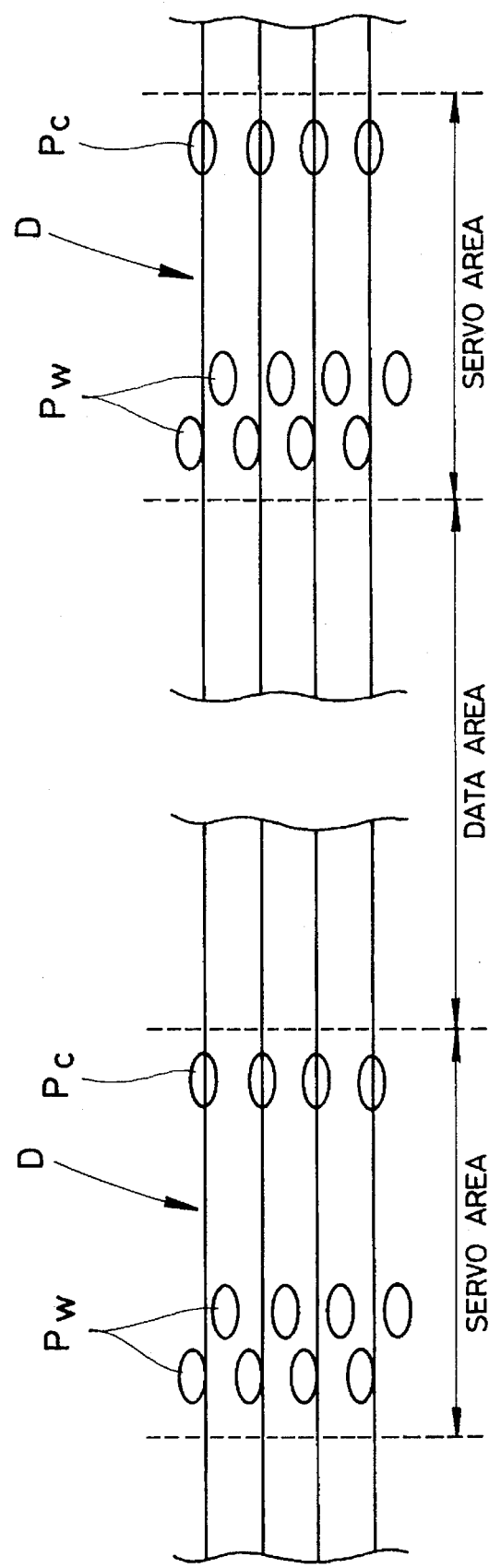
FIG. 6 is a diagram showing an example of configuration of an optical disk 3.

In this figure, the optical pick-up 1 irradiates a light beam to the optical disk 3 driven and rotated by the spindle motor 2. The optical disk 3 is a recording disk based on a sample servo system in which, for instance, servo areas and data areas are alternately and cyclically provided in the information reading direction. FIG. 6 shows an example of configuration of the optical disk 3 based on the sample servo system as described above.

As shown in this figure, in a servo area in the optical disk 3 are provided a wobble pit PW for tracking servo, a mirror surface section D for synchronism detection and focus servo, and a clock pit PC for regenerated clock phase detection formed for each recording track.

The optical pick-up 1 performs a photoelectric conversion of a reflected light from the optical disk to obtain a read signal "p", and supplies the signal to the bias circuit 4 comprising a capacitor C and a resistor R. The bias circuit 4 removes a DC element included in the read signal "p" supplied from the optical pick-up 1 and supplies the signal with the DC element having been removed to the A/D convertor 10. The A/D convertor 10 converts a read signal supplied through the bias circuit 4 from the optical pick-up 1 at a specified sample timing to a digital sample series "q" and supplies it to the dividing circuit 11, synchronism detecting circuit 12, and sample value extracting circuit 13 respectively.

The synchronism detecting circuit 12 makes a determination as to whether each sample value in the sample value series "q" continuously supplied from the A/D convertor corresponds to a mirror surface section D for synchronism detection as shown in FIG. 6, and supplies a detection signal to the timing generating circuit 14. The timing generating circuit 14 generates two pulse signals according to the detection signal and supplies the pulse signals as timing signals "t" to the sample value extracting circuit 13. One of the pulse signals is generated at a timing when a sample value corresponding to the mirror surface section D is being generated from the A/D convertor 10, and the other one of the pulse signals is generated at a timing when a sample value corresponding to a clock pit Pc shown in FIG. 6 is being generated from the A/D convertor. The sample value extracting circuit 13 extracts each sample value obtained during the period for generation of the timing signal "t" from the sample value series "q" continuously supplied from the A/D convertor 10, and supplies it as a sample value "s" for amplitude detection to the amplitude value detecting circuit 15. The amplitude value detecting circuit 15 obtains an amplitude value by means of subtraction between sample values "s" for amplitude detection as described above, and supplies an amplitude signal "r" corresponding to this amplitude value to the dividing circuit 11. The dividing circuit 11 divides each sample value in the sample value series "q" by a value corresponding to the amplitude signal "r", and supplies a result of division obtained in this step as a amplitude-corrected sample value series "k" to the Viterbi decoder 20.

It should be noted that the Viterbi decoder 20 has the same configuration as that shown in FIG. 3 and description thereof is omitted herein.

Figure 7:
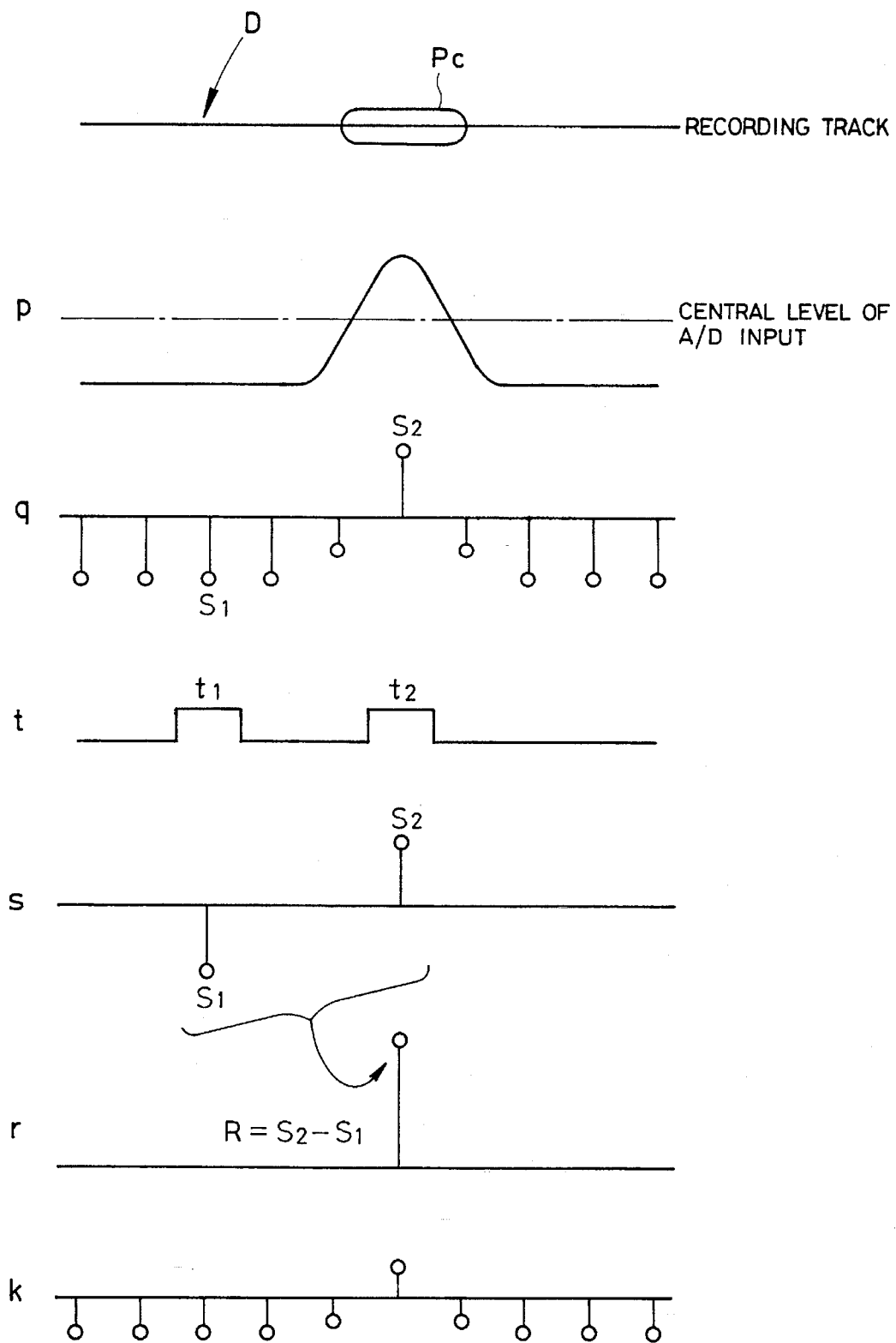
FIG. 7 is a diagram showing an operating waveform generated by the digital signal reproducing apparatus according to the first feature of the present invention.

FIG. 7 is a diagram showing an example of operating waveform in this configuration.

This figure shows waveform of each internal signal obtained when a servo area of the optical disk is traced by the optical pick-up 1. It should be noted that in FIG. 7 signals each with the same reference numeral as that in FIG. 5 are the same as those in FIG. 5.

In this step, the A/D convertor 10 supplies sample value series "q" corresponding to the mirror surface section D formed and clock pit Pc formed in the servo area to the synchronism detecting circuit 12 and sample value extracting circuit 13 respectively. The timing generating circuit 14 generates the timing signal "t" as shown in the figure at a timing t1 when a sample value corresponding to the mirror surface section D is being generated by the A/D convertor and at a timing t2 when a sample value corresponding to the clock pit Pc is being generated from the A/D convertor. The sample value extracting circuit 13 extracts sample values S1 and S2 obtained at the timing T1 and timing T2 as sample values "s" for amplitude detection from the sample value series "q". The amplitude value detecting circuit 15 obtains an amplitude value R by means of subtraction between sample values S1 and S2 as sample values "s" for amplitude detection, and supplies an amplitude signal "r" corresponding to the amplitude value R to the dividing circuit 11. The dividing circuit 11 supplies a result of division by means of dividing each sample value in the sample value series "q" continuously supplied from the A/D convertor by the amplitude value R above as an amplitude-corrected sample value series "k" to the Viterbi decoder 20.

As described above, an amplitude value of a read signal "p" is detected according to each sample value obtained when the optical pick-up 1 traces the mirror surface section D and clock pit Pc provided in a servo area of the optical disk 3, and an amplitude-corrected sample value series "k" is obtained by dividing each sample value in the sample value series "q" by this detected amplitude value.

For this reason, in a case where the detected amplitude value becomes larger as described above, each sample value in the sample value series "q" is divided by this large amplitude value, and when the detected amplitude value is small, each sample value in the sample value series "q" is divided by this small amplitude value, so that the amplitude-corrected sample value series "k" corrected to compensate amplitude fluctuation is obtained.

Figure 8:
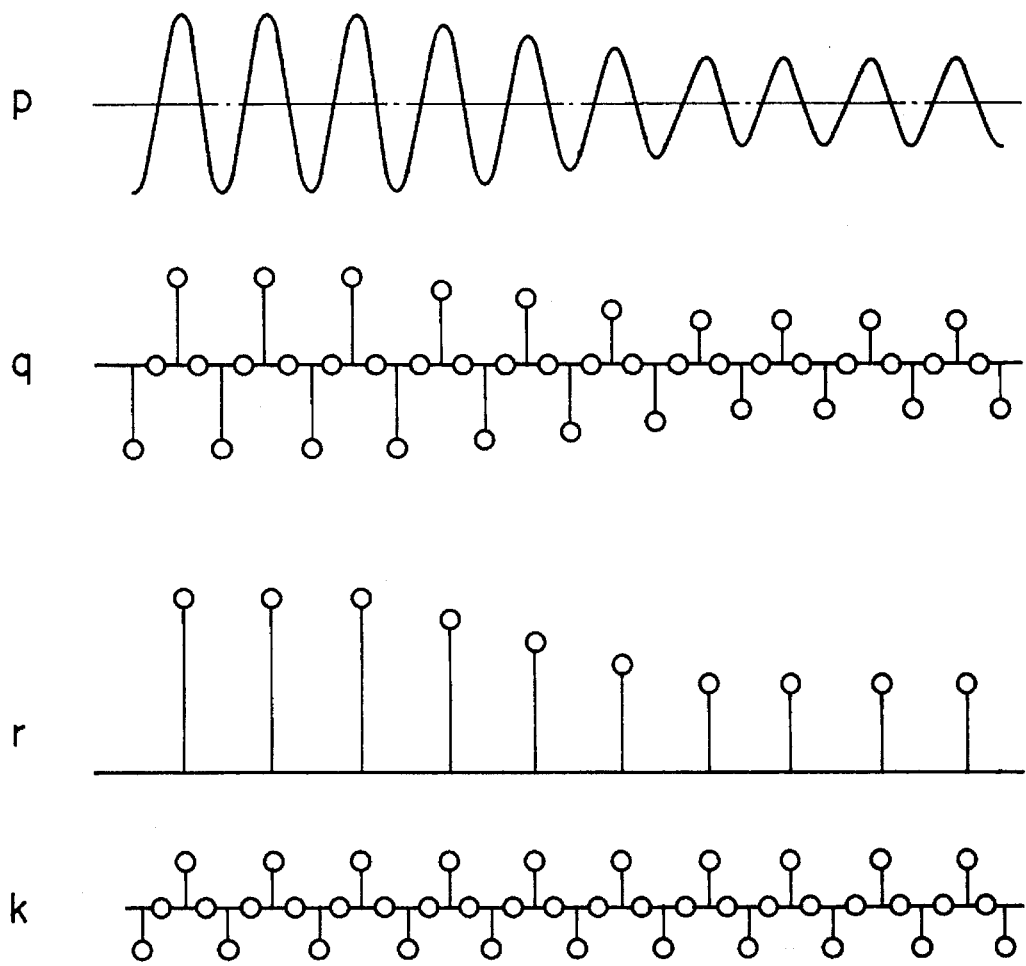
FIG. 8 is a diagram showing an operating waveform generated by the digital signal reproducing apparatus according to the first feature of the present invention.

So even in a case where amplitude fluctuation occurs in a read signal "p" and the sample value series "q" continuously supplied from the A/D convertor 10 changes as shown in FIG. 8, an amplitude value of the amplitude-corrected sample value series "k" supplied to the Viterbi decoder is kept at a constant level, and the Viterbi decoder can regenerate a digital signal without the decoding performance being deteriorated.

It should be noted that, although the amplitude signal "r" is generated according to a sample value in a servo area of the optical disk 3 in the embodiment described above, the configuration is not limited to that.

For instance, the present invention may be embodied with the configuration in which a specified signal pattern (for instance, a signal pattern in which a single frequency is repeated) is previously recorded, and a timing signal "t" is generated at an information read cycle to the specified area by the synchronism detecting circuit 12 and the timing generating circuit 14 shown in FIG. 5.

Figure 9:
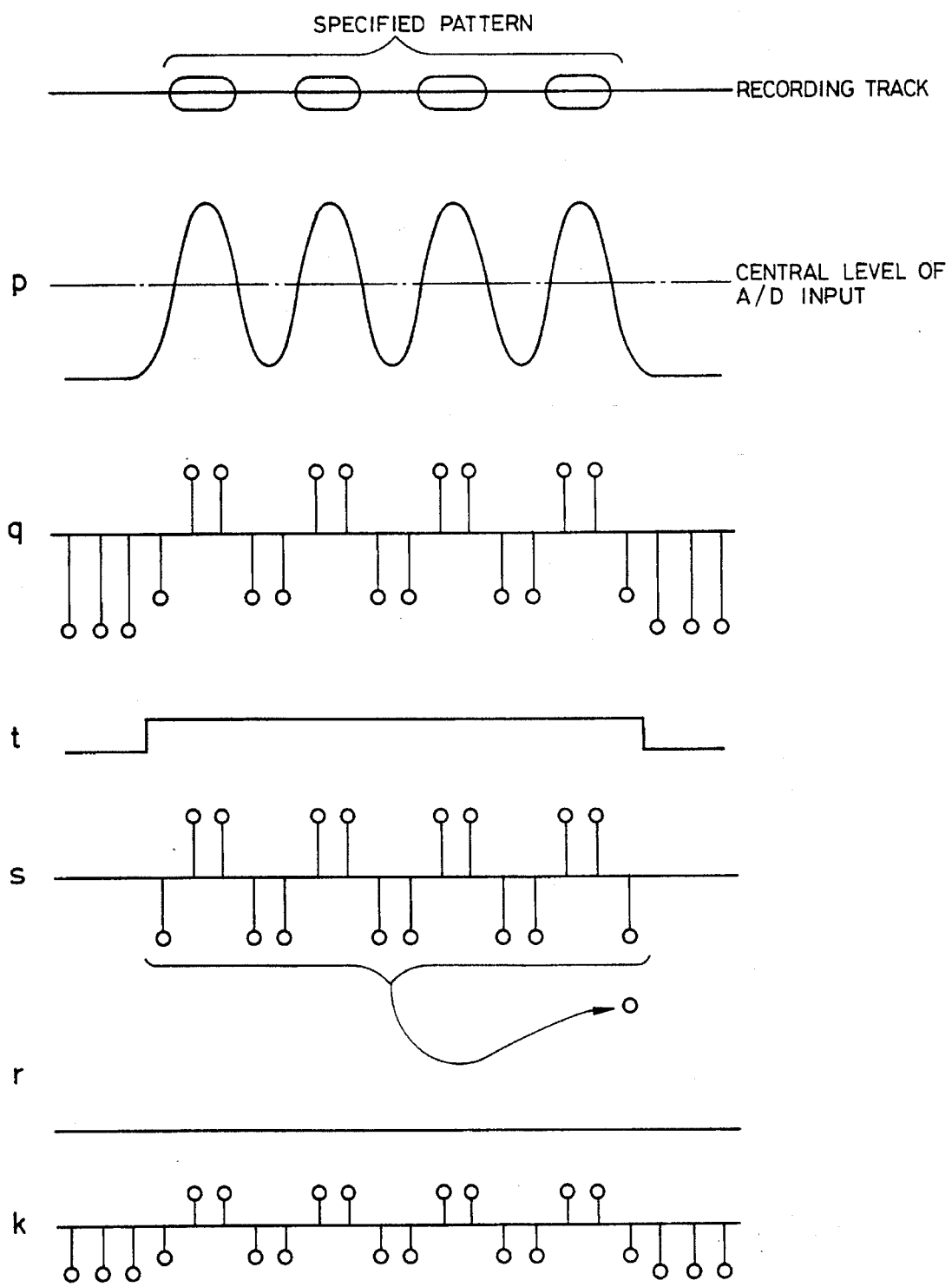
FIG. 9 is a diagram showing an operating waveform generated by a digital signal reproducing apparatus in another embodiment according to the first feature of the present invention.

FIG. 9 is a diagram showing an example of an operating waveform in the configuration.

As shown in this figure, the sample value extracting circuit 13 extracts sample values obtained during the period for generation of the timing signal "t", namely sample values each corresponding to the specified signal pattern as offset sample values "s" from the sample value series "q". In this step, the amplitude value detecting circuit 15 obtains an amplitude value by subtracting a minimum value of each sample value from a maximum value thereof, and generates it as the amplitude signal "r".

When the digital signal record reproducing system as described above is considered as a partial response system, a value provable as each sample value in the sample value series "q" is limited to a specific range. Herein, if a PR (1,1) system is applied as the partial response system, a value idealistically probable as a sample value in the sample value series "q" is, for instance, three values of {−1, 0, 1}.

For this reason, sometimes sample values corresponding to "1" as an idealistically provable maximum value and "−1" as an idealistically provable minimum value are extracted respectively, and these values are used as sample values "s" for amplitude detection.

Figure 10:
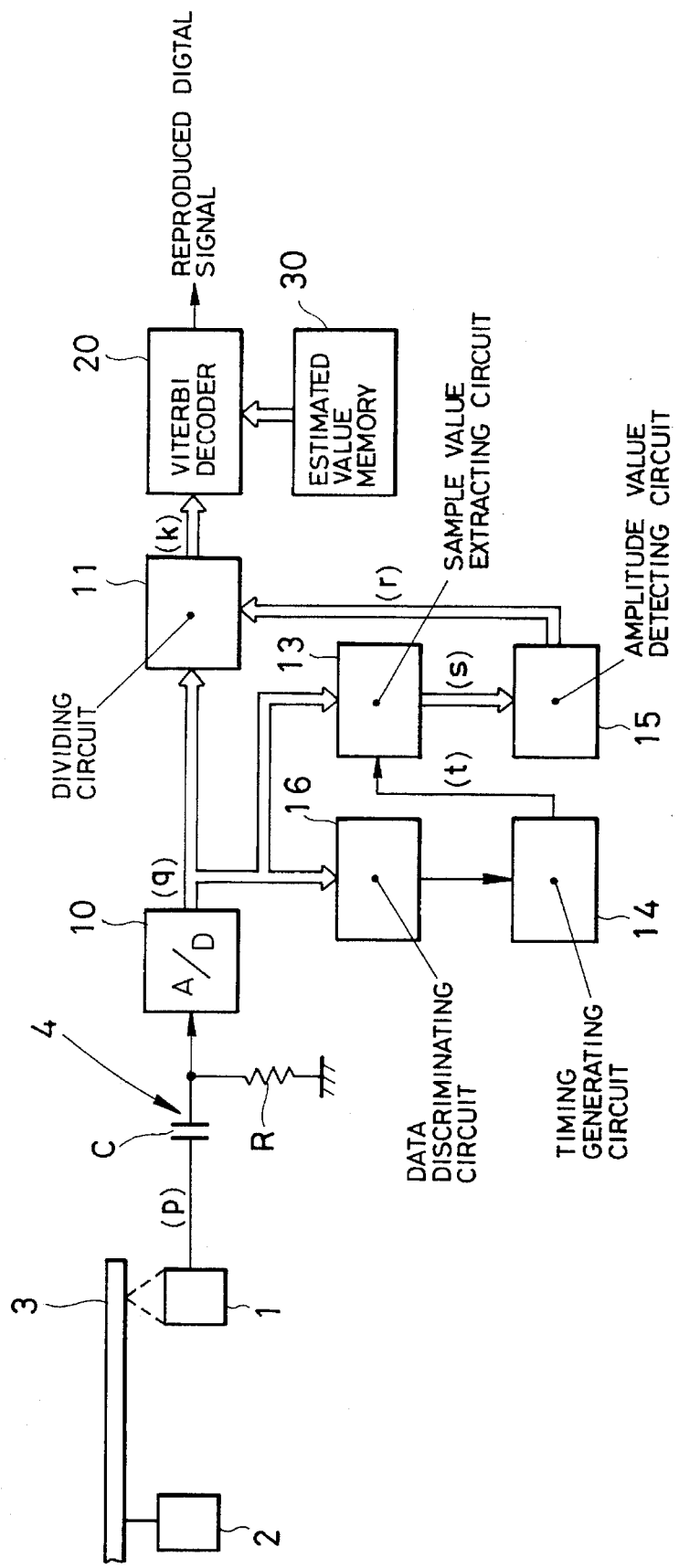
FIG. 10 is a diagram showing a digital signal reproducing apparatus in another embodiment according to the first feature of the present invention.
Figure 11:
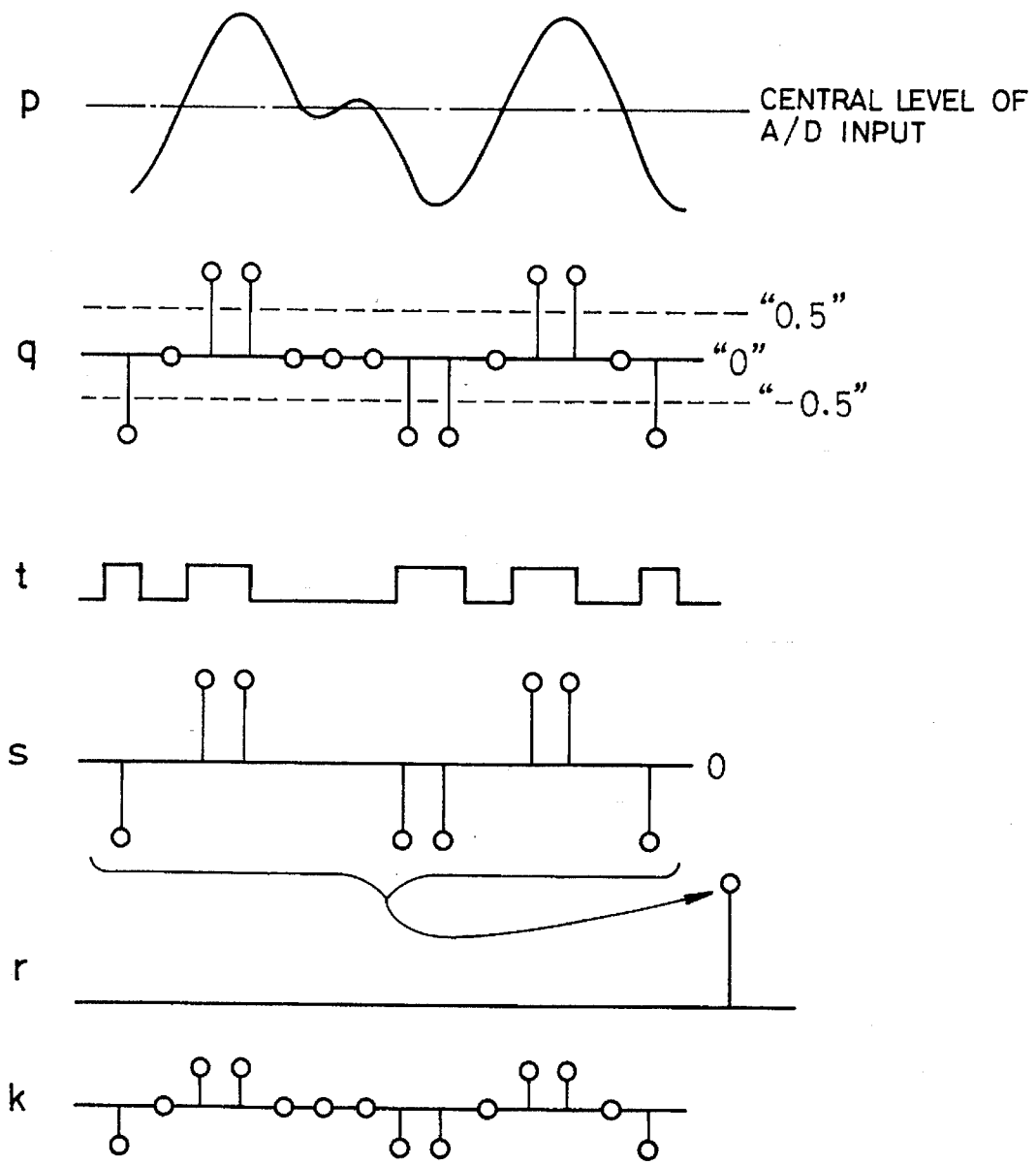
FIG. 11 is a diagram showing an operating waveform generated by a digital signal reproducing apparatus in another embodiment according to the first feature of the present invention.

FIG. 10 is a diagram showing an example of a digital signal reproducing apparatus having the configuration as described above, while FIG. 11 is a diagram showing an example of operating waveform in the configuration as described above.

It should be noted that, in this figure, the same reference numerals are assigned to the same functional modules as those in FIG. 5. In this figure, the sample value series "q" obtained by the A/D convertor 10 is supplied to the dividing circuit 11, data discriminating circuit 16, and sample value extracting circuit 13 respectively. The data discriminating circuit 16 generates a data discrimination signal, when a level of each sample value in the sample value series "q" is less than −0.5 or more than 0.5, and supplies the signal to the timing generating circuit 14. The timing generating circuit 14 generates a timing signal "t" having a specified pulse width according to the data discrimination signal, and supplies the signal to the sample value extracting circuit 13. The sample value extracting circuit 13 extracts each sample value obtained during a period for generation of the timing signal "t" from the sample value series "q" continuously supplied from the A/D convertor 10, and supplies it as a sample value "s" for amplitude detection to the amplitude value detecting circuit 15. The amplitude value detecting circuit 15 obtains an amplitude value by subtracting a sample value for amplitude detection less than −0.5 from that with a level of 0.5 or more, both of which are sample values "s" for amplitude detection, and supplies it as an amplitude signal "r" to the dividing circuit 11 the dividing circuit 11 uniformly divides each sample value in the sample value series "q" by a value corresponding to the amplitude signal "r", and supplies a result of division in this step as the amplitude-corrected sample value series "k" to the Viterbi decoder 20.

Namely an amplitude value is obtained by subtracting a minimum sample value having a minimum level from a maximum sample value having a maximum level, both extracted from the sample value series "q", and a value obtained by uniformly dividing each sample value in the sample value series "q" by this amplitude value may be used as the amplitude-corrected sample value "k".

In the embodiment above, the amplitude- corrected sample value "k" compensated for amplitude is obtained by dividing each sample value in the sample value series "q" by a value corresponding to the amplitude signal "r" using the dividing circuit 11, and next description is made for configuration in which amplitude correction is executed without using this dividing circuit 11.

Figure 12:
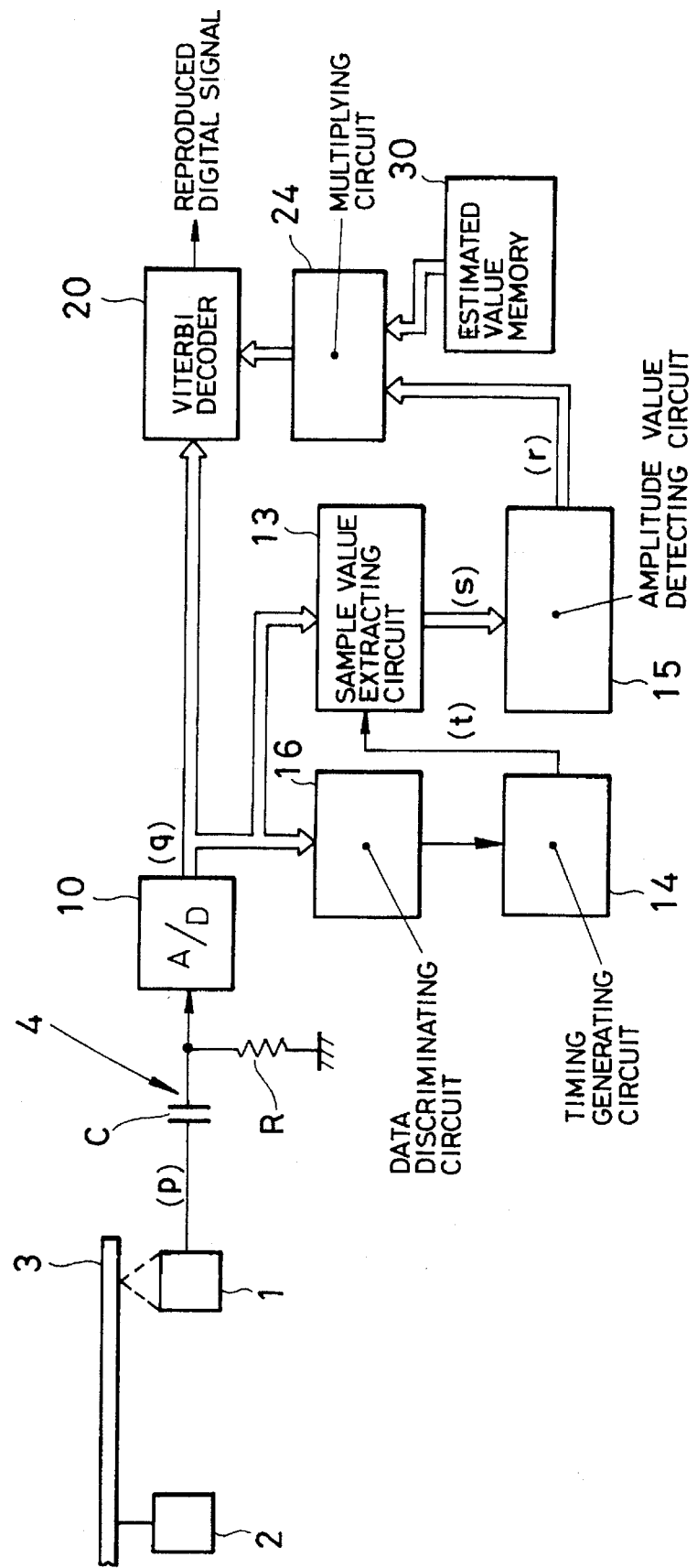
FIG. 12 is a diagram showing configuration of a digital signal reproducing apparatus according to a second feature of the present invention.

FIG. 12 is a diagram showing configuration of a digital signal reproducing apparatus according to a second feature of the present invention made in the light of the circumstances as described above.

FIG. 12 shows an example of configuration of a digital signal reproducing apparatus applied in a case where a digital signal record reproducing system is a PR (1,1) partial response system.

In this figure, the optical pick-up 1 irradiates a light beam onto the optical disk 3 driven and rotated by the spindle motor 2. Furthermore, the optical pick-up 1 obtains a read signal "p" by subjecting a reflected light from the optical disk 3 to photoelectric conversion, and supplies the read signal "p" to the bias circuit comprising a capacitor C and a resistor R. The bias circuit 4 removes a DC element included in the read signal "p" supplied from the optical pick-up 1, and supplies the signal with the DC element having been removed to the A/D convertor 10. The A/D convertor converts the read signal supplied through the bias circuit 4 from the optical pick-up 1 at a specified sample timing to a sample value series "q", and supplies it to the data discriminating circuit 16, sample value extracting circuit 13, and Viterbi decoder 20 respectively. Data discriminating circuit 16 generates a data discrimination signal in a case where a level of each sample value in the sample value series "q" is less than −0.5 or ore than 0.5, and supplies the signal to the timing generating circuit 14. The timing generating circuit 14 generates a timing signal "t" having a specified pulse width according to the data discrimination signal and supplies it to the sample value extracting circuit 13.

The sample value extracting circuit 13 extracts each sample value obtained during a period for generation of the timing signal "t" from the sample value series "q" continuously supplied from the A/D convertor 10, and supplies it as a sample value "s" for amplitude detection to the amplitude value detecting circuit 15. The amplitude value detecting circuit 15 obtains an amplitude value by means of subtraction between a sample value for amplitude detection having a level of 0.5 or more and a sample value for amplitude detection having a less of less than −0.5, both of which are sample values "#s" for amplitude detection, and supplies the amplitude value as an amplitude signal "r" to the multiplying circuit 24. Previously stored in the estimated value memory 30 are an ideal value provable as each sample value in the sample value series "q" (a value obtained when not affected by noise or the like) and a plurality of estimated sample values, and each of the estimated sample values is supplied to the multiplying circuit 24 respectively. The multiplying circuit 24 obtains a amplitude-corrected estimated sample value by uniformly multiplying each of all the estimated sample values stored in the estimated value memory 30 by a value corresponding to the amplitude signal "r" described above, and supplies the amplitude-corrected estimated sample values to the Viterbi decoder 20. It should be noted that the Viterbi decoder 20 has the same configuration as that shown in FIG. 3.

Figure 13:
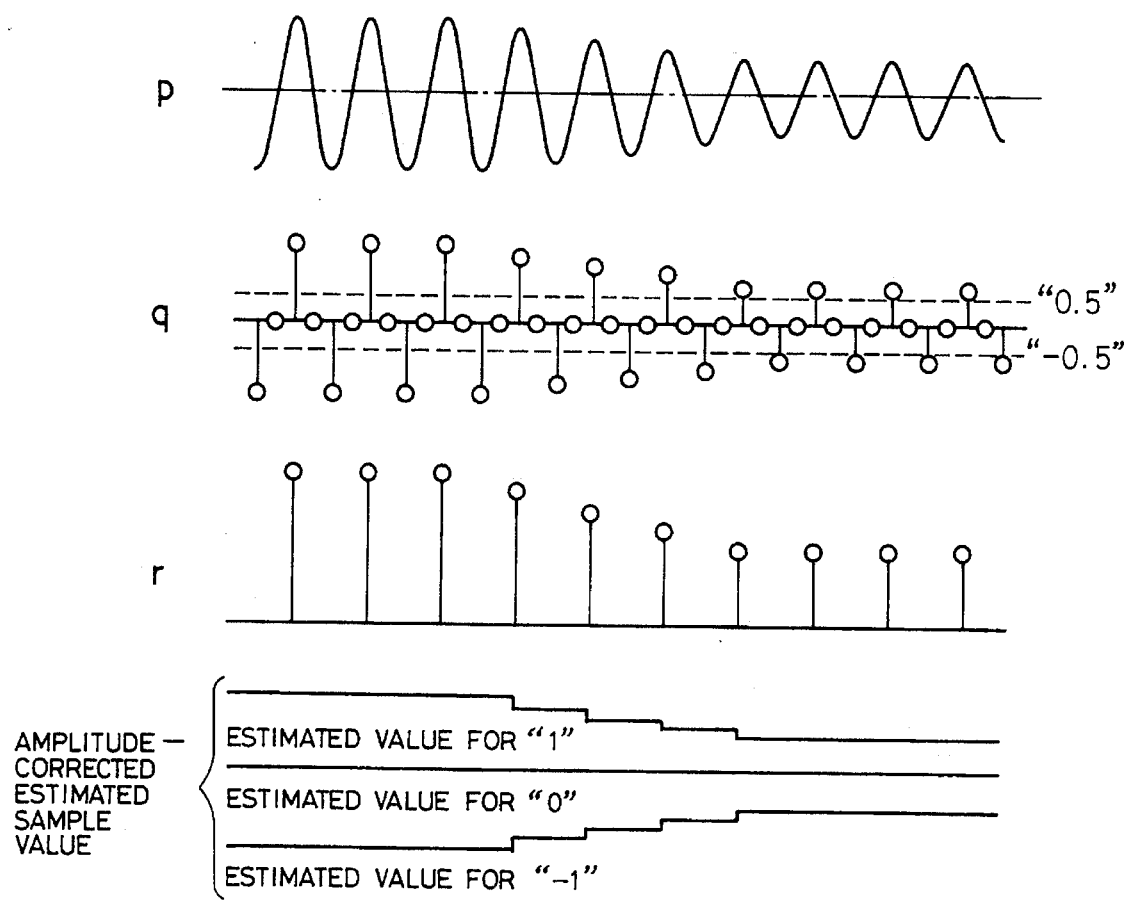
FIG. 13 is a diagram showing a digital signal reproducing apparatus in another embodiment according to the second feature of the present invention.

Next description is made for operations in the configuration with reference to FIG. 13.

At first, as there are three values of {−1, 0, 1} as provable values in the idealistic sample value series "q" obtained by the A/D convertor 10, each of the values are stored as an estimated sample value in the estimated value memory 30. Herein, if amplitude fluctuation occurs in a read signal "p" according to elapse of time as shown in FIG. 13, also each sample value in the sample value series "q" obtained by the A/D convertor 10 changes according to the amplitude fluctuation. In this step, the sample value extracting circuit 13 and amplitude value detecting circuit 15 extract sample values having a level of more than 0.5 or less than −0.5 from sample values in the sample value series "q" obtained by the A/D convertor 10, obtain an amplitude value according to the sample values, and supply an amplitude signal "r" according to this amplitude value to the multiplying circuit 24. For this reason, amplitude-corrected estimated sample values obtained by uniformly multiplying each of the three estimated sample values of {−1, 0, 1} by a value corresponding to the amplitude signal "r" are outputted from the multiplying circuit 24 as shown in FIG. 13.

The branch-metric computing circuit 21 in the Viterbi decoder 20 supplies a square error between the amplitude-corrected estimated sample value supplied from the multiplying circuit 24 and the sample value series 37 q", namely {[sample value series "q"] - [amplitude corrected estimated sample value]}$^2$ as a branch-metric signal to the path-metric computing circuit 22.

Assuming that the amplitude value detected by the amplitude value detecting circuit 15 is R, the branch-metric signal generated by the branch-metric computing circuit 21 is expressed by the following expression;

$$\{[\text{sample value series "q"}] - [\text{Estimated sample value}] \cdot R\}^2 = \quad (1)$$
$$R^2 \cdot \{[\text{sample value series "q"}]/R - [\text{Estimated sample value}]\}^2$$

On the other hand, in the configuration as shown in FIG. 5, a value with this amplitude R having been removed from the sample value series "q" by the dividing circuit 11 is supplied to the Viterbi decoder 20, so that the branch-metric signal generated by the branch-metric computing circuit 21 is expressed by the following expression;

$$\{[\text{sample value series "q"}]/R - [\text{Estimated sample value}]\}^2 \quad (2)$$

As shown above, R2 as a coefficient in the two expressions above is different from each other.

As described above, in Viterbi decoding, a provable data series is decoded by comparing accumulative sums of the branch-metric signals obtained in each path to obtain a path providing a minimum accumulative sum. For this reason, any signal can be used as the branch-metric signal so far as comparison of relative values each corresponding to each signal can be executed, and either branch-metric expressed by the above expression (1) or expression (2) makes it possible to execute normal decoding.

As described above, also with the configuration as shown in FIG. 12, like with the configuration as shown in FIG. 5, Viterbi decoding can be executed correcting amplitude fluctuation in the sample value "q".

It should be noted that, with the configuration as shown in FIG. 12, an amplitude-corrected estimated sample value is obtained by multiplying a detected amplitude value by an estimated sample value, but the present invention is not limited to the configuration. For instance, such configuration is allowable where the multiplying circuit 24 is not used, values obtained by multiplying estimated sample values by an amplitude value provable due to amplitude fluctuation previously, and the values are stored in the estimated value memory.

Figure 14:
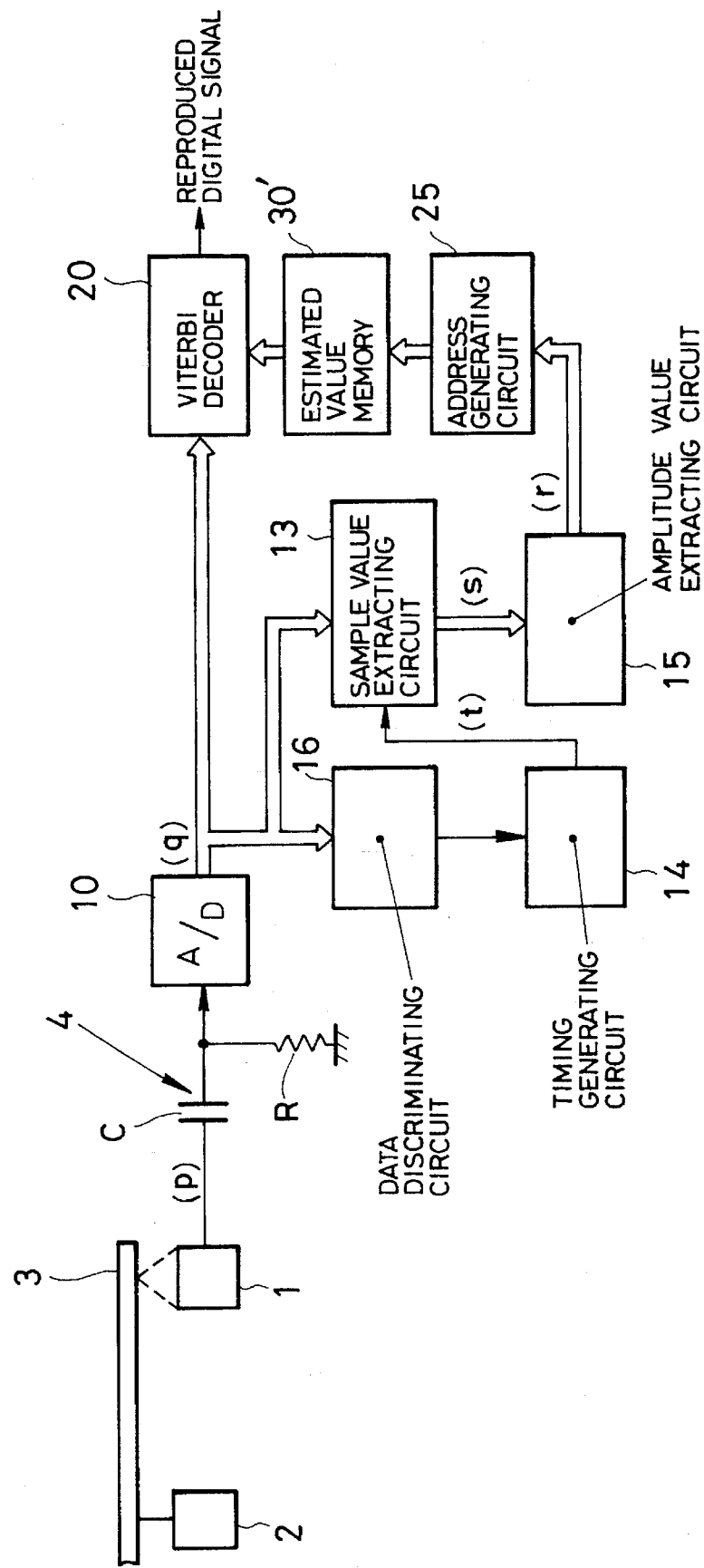
FIG. 14 is a diagram showing configuration of a digital signal reproducing apparatus in another embodiment according to the second feature of the present invention.

FIG. 14 is a diagram showing configuration of a digital signal reproducing apparatus according to another embodiment of the present invention make in the light of the circumstances as described above.

It should be noted that the same reference numerals are assigned to the same functional modules in FIG. 14 as those in FIG. 12. In FIG. 14, an address generating circuit 25 supplies an address signal corresponding to an amplitude signal "r" supplied from the amplitude value detecting circuit 15 to the estimated value memory 30'. The estimated value memory 30' reads out each of the amplitude-corrected estimated sample value corresponding to the address signal supplied thereto from contents of the memory, and supplies it to the Viterbi decoder 20.

FIG. 15 is a diagram showing an example of a memory map in the estimated value memory 30'.

Herein, assuming that values preferably provable in the sample value series "q" are three values of {−1, 0, 1}, if these values are obtained as the sample value series "q", an amplitude value detected by the amplitude value detecting circuit 15 is 2. In this step, the address generating circuit 25 supplies 3 as an address signal to the estimated value memory 30'. The estimated value memory 30' supplies each of −1, 0, and 1, each stored therein, as an amplitude-corrected estimated sample value according to the address signal to the branch-metric computing circuit 21. Namely, if an amplitude value in the sample value series "q" is 2 as a normal value, all of the three values {−1, 0, 1} are supplied as amplitude-corrected estimated sample values as they are to the branch-metric computing circuit 21. If amplitude fluctuation of −10% is generated in the sample value series "q", an amplitude value detected by the amplitude value detecting circuit 15 is 1.8. The estimated value memory 30' supplies −0.9, 0, and 0.9, each stored therein as amplitude-corrected estimated sample value according to the address signal to the branch-metric computing circuit 21. Also, if amplitude fluctuation of +10% occurs in the sample value series "q", the amplitude value detected by the amplitude value detecting circuit 15 is 2.2. In this step, the address generating circuit 25 supplies 5 as an address signal to the estimated value memory 30'. The estimated value memory 30' supplies −1.1, 0, and 1.1, each stored therein, as an amplitude-corrected sample value according to the address signal to the branch-metric computing circuit 21.

It should be noted that, although estimated sample values are previously stored in a memory, the configuration is also allowable where estimated sample values are generated without using the memory.

Figure 16:
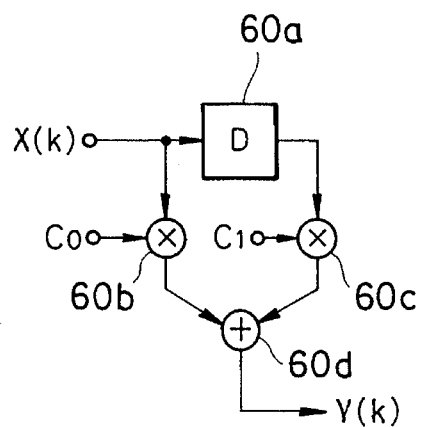
FIG. 16 is a diagram showing an example of configuration of an FIR filter.

For instance, if a relation between an input and an output in the digital signal reproducing system as a transfer path can be expressed by the following expression;

$$Y(K)=C_0.X(k)+C_1.X(k-1) \quad (3)$$

wherein X (k) indicates an input value at a time point k, Y(k) an output value at a time point k, and $C_0$, $C_1$ transfer path coefficient respectively, the digital signal reproducing system can be regarded as equivalent to the FIR (Finite Impulse Response) filter as shown in FIG. 16.

In FIG. 16, an input value X (k) at a specified sampling timing k is supplied to a 1-sample delay circuit 60a and a multiplier 60b. The 1-sample delay circuit 60a supplies an input value X (k−1) supplied thereto by 1 sampling cycle before the specified sampling timing K to a multiplier 60c. As shown by the above expression (3), an adder d supplies a sum obtained by adding $C_0.X(k)$ obtained by the multiplier 60b to $C_1.X(k-1)$ obtained by the multiplier 60c as an output value Y(k) at a timing K.

Assuming herein that the input value is a binary value of −1 or 1, combinations provable as series of { X (k), X (k−1) } are 4 types of {−1, −1 }, {−1,1 }, {1, −1 }, and {1,1}. For this reason, patterns of signals supplied to the multipliers 60b and 16c are limited to the 4 types of pattern as shown above.

Figure 17:
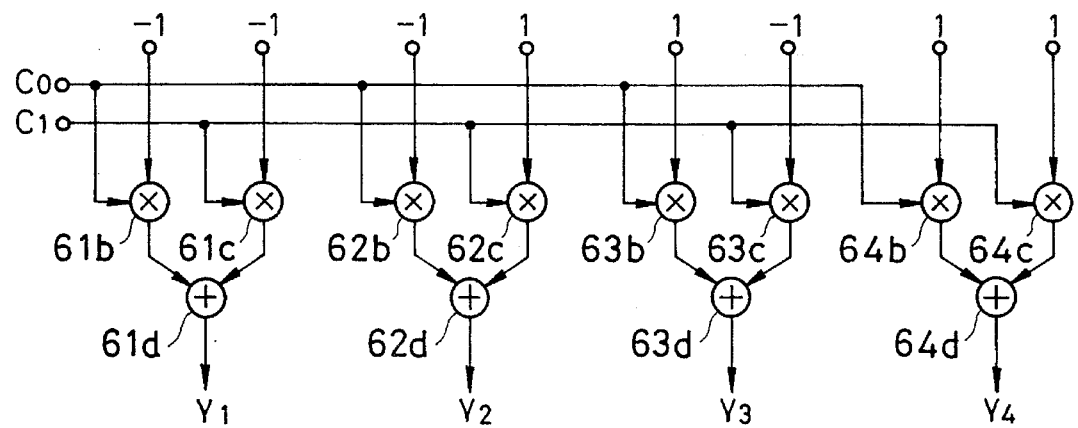
FIG. 17 is a diagram showing an example of an estimated sample value generating circuit incorporating the FIR filter therein.

For this reason, a value provable as an output from the digital signal reproducing system, namely an estimated value can be obtained by the estimated sample value generating circuit as shown in FIG. 17.

In FIG. 17, an estimated output value $Y_1$ in the input value series {−1, −1} is obtained by an FIR filter consisting of the multipliers 61b, 61c, and 61d. Also an estimated output value $Y_2$ in the input value series {−1,1} is obtained by an FIR filter consisting of the multipliers 62b, 62c and an adder 62d. An estimated output value $Y_3$ in the input value series {1,−1} is obtained by an FIR filter consisting of the multiplier 63b, 63c and an adder 63d. An estimated output value $Y_4$ in the input value series {1, 1} is obtained by an FIR filter consisting of the multipliers 64b, 64c and an adder 64d.

Figure 18:
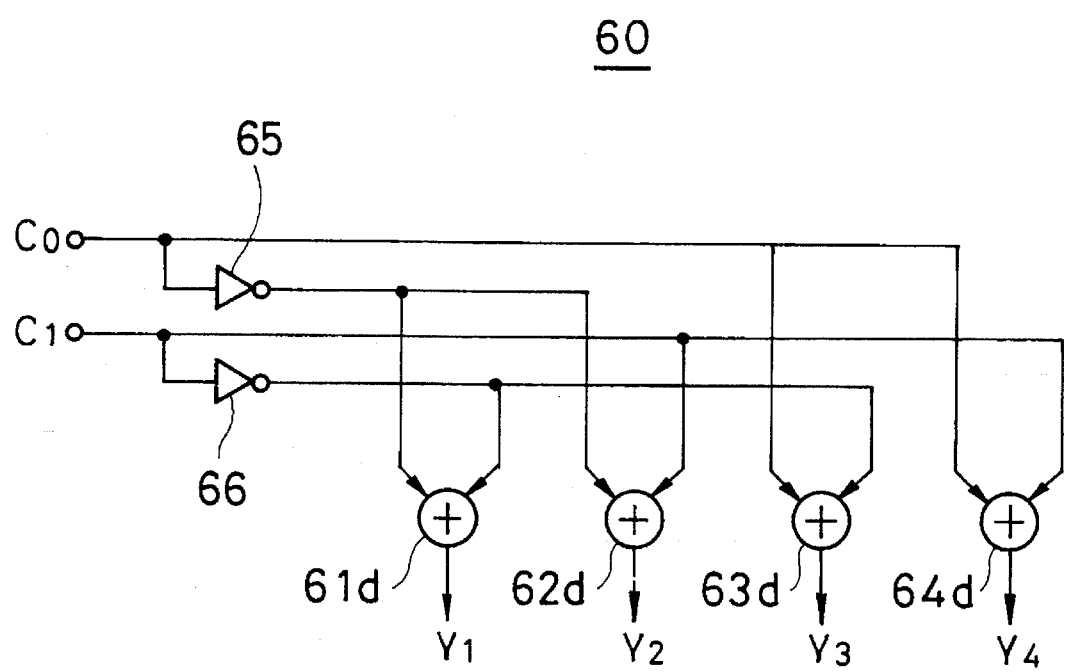
FIG. 18 is a diagram showing an example of an estimated sample value generating circuit 60.

In the embodiment shown in FIG. 17, an input signal from the FIR filter is fixed to −1 or 1, so that the configuration can be simplified to that as an estimated sample value generating circuit 60 shown in FIG. 18.

In FIG. 18, inverting circuits 65, 66 invert a plurality of transfer path coefficients $C_0$, $C_1$ respectively without changing the absolute value. The inverting circuits 65, 66 execute the same operation as cation of −1. Thus, the expressions of $Y_0=-C_0-C_1$, $Y_2=-C_0+C_1$, $Y_3=C_0-C_1$, and $Y_4=C_0+C_1$ are obtained as shown in FIG. 18.

Figure 19:
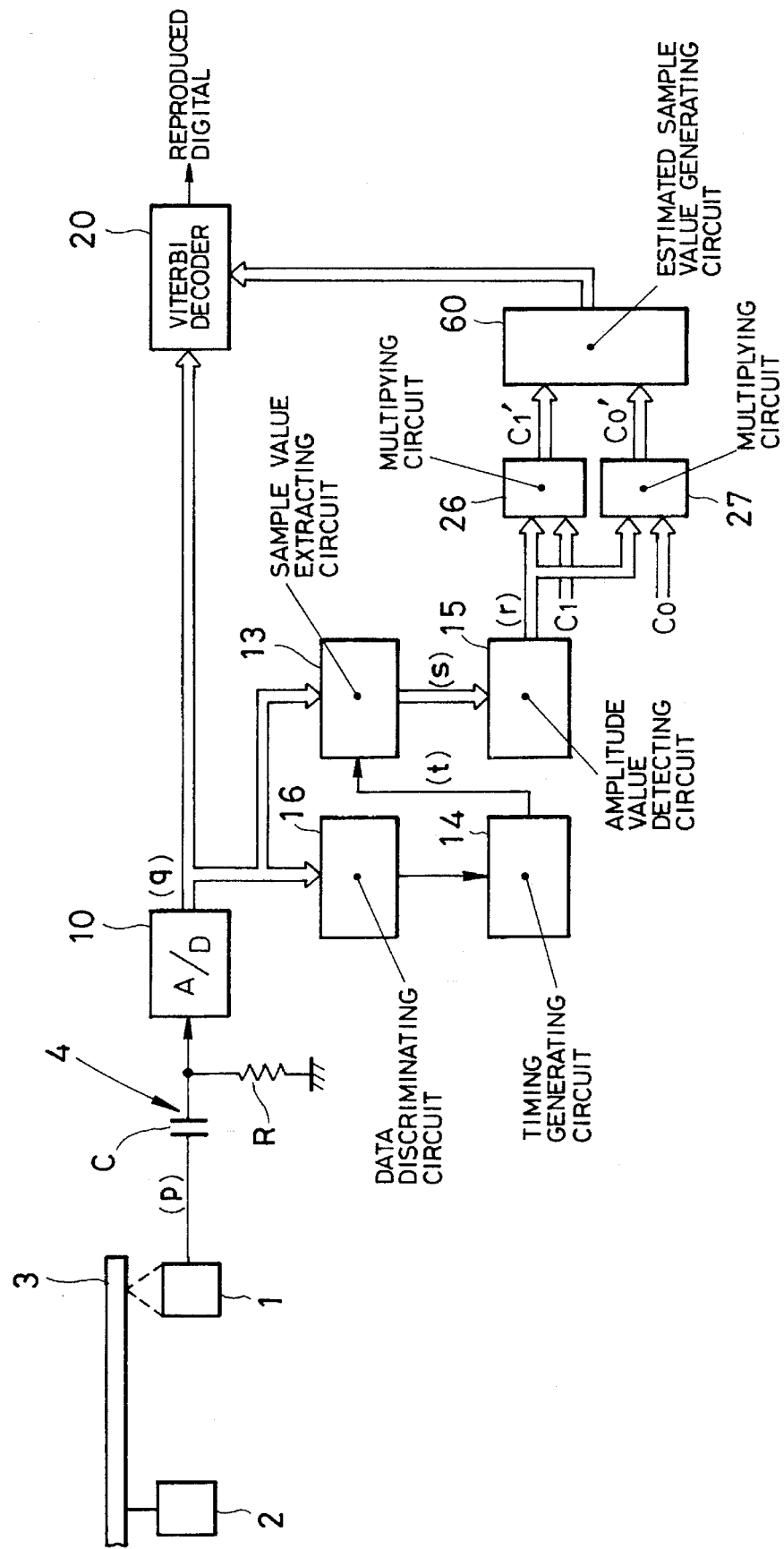
FIG. 19 is a diagram showing another embodiment of the digital signal reproducing apparatus according to a second feature of the present invention.

FIG. 19 is a diagram showing other configuration of the digital signal reproducing apparatus according to the second feature of the present invention constructed with the estimated sample value generating circuit 60 as described above.

It should be noted that in FIG. 19 the same reference numerals are assigned to the same reference numerals as those in FIG. 12. In FIG. 19, the multiplying circuit 26 executes cation of $C_1$ as the transfer path coefficient as described above by a corresponding to the amplitude signal "r" supplied from the amplitude value detecting circuit 15, and supplies a result of cation as an amplitude correction transfer path coefficient $C_1'$ to the estimated sample value generating circuit 60. The multiplying circuit 27 multiplies $C_0$ as the transfer path coefficient by a value corresponding to the amplitude signal "r" supplied from the amplitude value detecting circuit 15, and supplies a result of cation as the amplitude correction transfer path coefficient $C_0'$ to the estimated sample value generating circuit 60.

The estimated sample value generating circuit 60 supplies $-C_0'$, $-C_1'$ as the estimated sample value $Y_1$, $-C_0'$, $+C_1'$ as an estimated sample value $Y_2$, $C_0'$, $+C_1'$ as the estimated sample value $Y_3$, and $C_0'$, $+C_1$ as the estimated sample value $Y_4$ respectively to the Viterbi decoder 20.

With the configuration as shown in FIG. 19, a memory to store therein estimated sample value (estimated value memory 30) is not necessary, so that the configuration can be simplified.

It should be noted that, although in the configuration shown in FIG. 19 the amplitude correction transfer path coefficients $C_0'$ and $C_1'$ are realized with the multiplying circuits 26 and 27, the present invention is not limited to the configuration. For instance, other configuration is allowable where the multiplying circuits 26, 27 are not used, values obtained by multiplying each of the transfer path coefficients $C_0$ and $C_1$ by an amplitude value due to provable amplitude fluctuation are previously prepared as amplitude correction transfer path coefficients $C_0'$ and $C_1'$, and the coefficients are stored in a coefficient memory.

Figure 20:
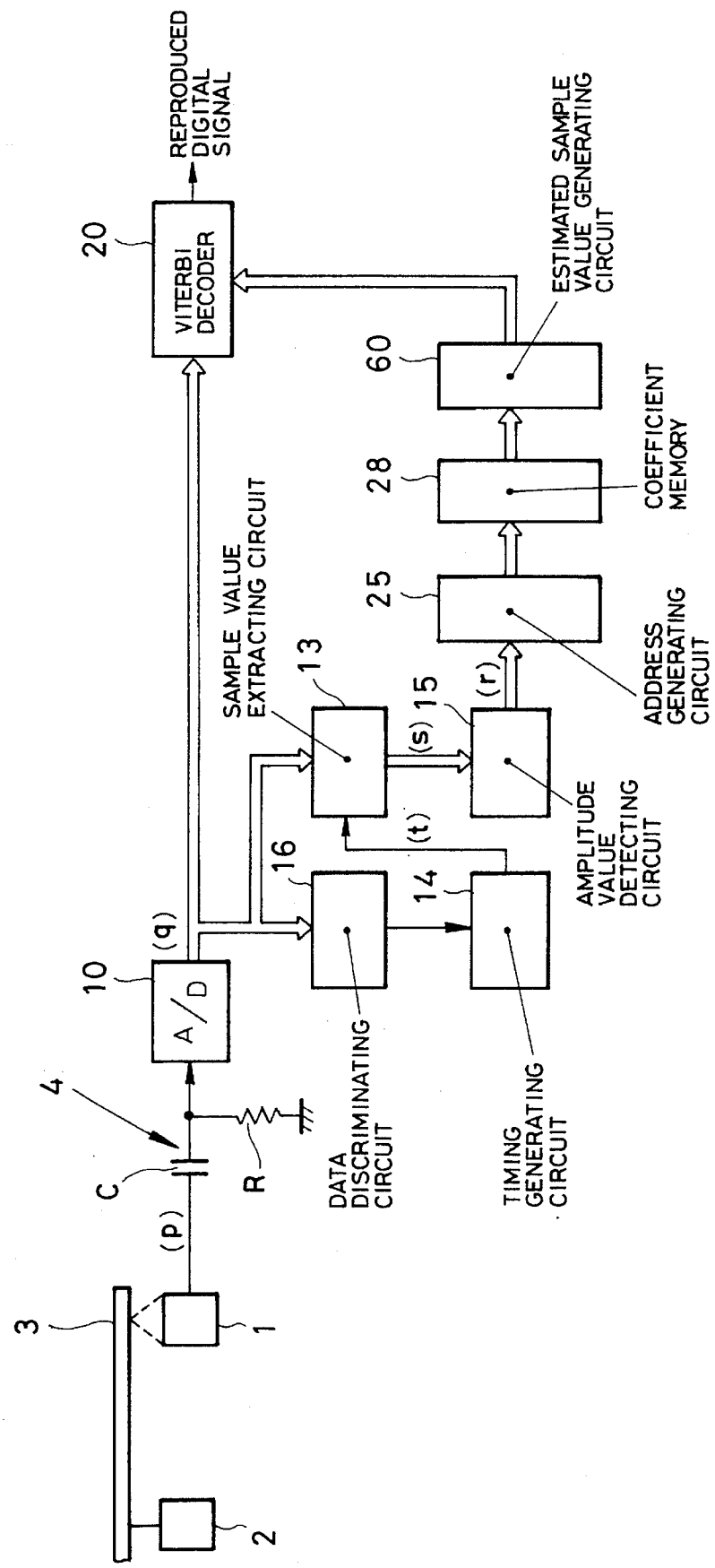
FIG. 20 is a diagram showing still another embodiment of the digital signal reproducing apparatus according to the second feature of the present invention.

FIG. 20 is a diagram showing other configuration of the digital signal reproducing apparatus according to the second feature of the present invention made in the light of the circumstances as described above.

It should be noted that in FIG. 20 the same reference numerals are assigned to the same functional modules as those shown in FIG. 19.

In the FIG. 20, the address generating circuit 25 supplies an address signal corresponding to the amplitude signal supplied from the amplitude value detecting circuit 15 to the coefficient memory 28. The coefficient memory 28 reads output each of the amplitude correction transfer path coefficients each corresponding to an address signal supplied thereto and supplies the coefficient values to the estimated sample value generating circuit 60.

FIG. 21 is a diagram showing an example of memory map in the coefficient memory 28.

Assuming herein that values preferably provable in the sample value series "q" are three values of {−1, 0, 1}, if these value are actually obtained as the sample value series "q", the amplitude value detected by the amplitude value detecting circuit 15 is 2. In this step, the address generating circuit 25 supplies 3 as an address signal to the coefficient memory 28. The coefficient memory 28 supplies $C_0$, $C_1$, each stored therein, as the amplitude correction transfer path coefficients $C_0'$ and $C_1'$ respectively according to the address signal to the estimated sample value generating circuit 60. Namely, in a case where an amplitude value in the sample value series "q" is 2 as a normal value, the transfer path coefficients $C_0$, $C_1$ are supplied as amplitude correction transfer path coefficients to the estimated sample value generating circuit 60 as they are. If amplitude fluctuation of −10% is generated in the sample value series "q", the amplitude value detected by the amplitude value detecting circuit 15 is 1.8. Then, the address generating circuit 25 supplies 1 as an address signal to the coefficient memory 28. The coefficient memory 28 supplies $0.9.C_0$ and $0.9.C_1$ as amplitude correction transfer path coefficients $C_0'$ and $C_1'$ respectively to the estimated sample value generating circuit 60. If amplitude fluctuation of +10% is generated in the sample value series "q", the amplitude value detected by the amplitude value detecting circuit 15 is 2,2. In this step, the address generating circuit 25 supplies 5 as an address signal to the coefficient memory 28. The coefficient memory 28 supplies $1.1.C_0$ and $1.1.C_1$ as amplitude correction transfer path coefficients $C_0'$ and $C_1 40$ respectively according to the address signal to the estimated sample value generating circuit 60.

As described above, he digital signal reproducing apparatus according to the first feature of the present invention subjects a read signal from a recording medium to A/D conversion to convert it to a digital sample value series, obtains an amplitude value according to a result of subtraction between a maximum sample value having a maximum level of sample values in the sample value series and a minimum sample value having a minimum level having a minimum level among sample values in the sample value series, and uniformly divides each of the sample values subjected to A/D conversion described above to obtain a corrected sample value compensated for amplitude fluctuation.

The digital signal reproducing apparatus according to the second feature of the present invention subjects a read signal read from a recording medium to convert it to a digital sample value series, obtains an amplitude value according to a result of subtraction between a maximum sample value having a maximum level of sample values in the sample value series and a minimum value having a minimum level of sample values in the sample value series, and supplies a value obtained by uniformly multiplying each of the estimated sample values in the Viterbi decoder by this amplitude value as a final estimated sample value to the viterbi decoder.

For the reasons as described above, even if a positional error due to some mechanical reasons in reproducing information from a recording medium or amplitude fluctuation due to fluctuation of the characteristic of a recording medium should occur in a read signal, it is possible to execute Viterbi decoding compensating for this amplitude fluctuation, so that a digital signal can be regenerated without deteriorating the decoding performance of the Viterbi decoding.

What is claimed is:

1. A digital signal reproducing apparatus for obtaining a regenerated digital signal by reproducing record information from a read signal read from a recording medium on which digital signals are recorded, said digital signal reproducing apparatus comprising:

an A/D convertor for successively sampling said read signal and converting the signal to a digital sample value series, a sample value extracting means for extracting a maximum sample value having a maximum level and a minim sample value having a minimum level from sample values in said sample value series, an amplitude value detecting means for obtaining an amplitude value according to a result of subtraction between said maximum sample value and said minimum sample value and generating an amplitude signal corresponding to said amplitude value, a dividing means for obtaining a result of dividing each of the sample values in said sample value series by a value corresponding to said amplitude signal as an amplitude-corrected sample value, and a decoding means for executing decoding according to said amplitude-corrected sample value to obtain a regenerated digital signal.

2. A digital signal reproducing apparatus according to claim 1, wherein a mirror surface section and an isolated pit for synchronism detection are formed in said recording medium, and said sample value extracting means extracts a sample value corresponding to said mirror section on the sample values in said sample value series as said minimum sample value and also extracts a sample value corresponding to said isolated pint as said maximum sample value of the sample values in said sample value series.

3. A digital signal reproducing apparatus according to claim 1, wherein said recording medium stores a specified pattern signal recorded therein, and said sample value extracting means extracts said maximum sample and the minimum sample value of sample values in a specified sample value spring corresponding to said specified pattern signal among said sample value series.

4. A digital signal reproducing apparatus according to claim 1, wherein said recording medium stores information signals recorded therein based on the partial response system, and said sample value extracting means extracts a sample value having a level higher than a specified first level from sample values in said sample value series as said maximum sample value and also extracts a sample value having a level lower than a specified second level from sample values in said sample value series as said minimum sample value.

5. A digital signal reproducing apparatus according to claim 1, wherein said decoding means is a Viterbi decoder.

* * * * *